Sept. 19, 1961   E. CONWELL ET AL   3,001,134
SEMICONDUCTOR DEVICE
Filed Oct. 10, 1958
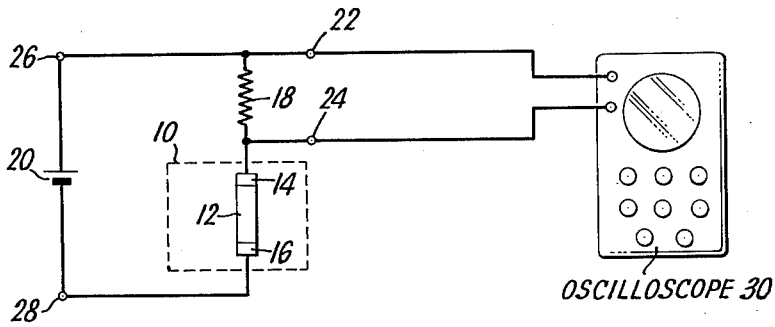
Fig.1
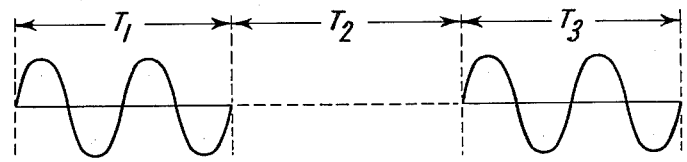
Fig.2a
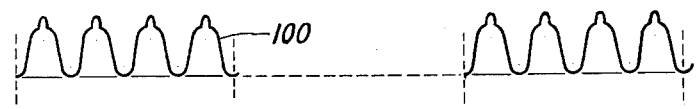
Fig.2b
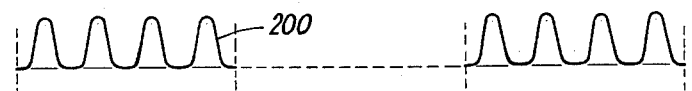
Fig.2c
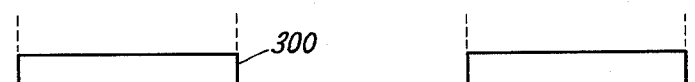
Fig.2d
Fig.3
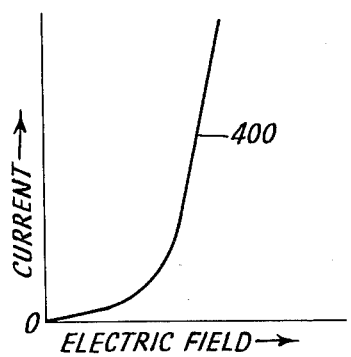
INVENTORS
ESTHER CONWELL
ABRAHAM MANY
BY
ATTORNEY

United States Patent Office 3,001,134
Patented Sept. 19, 1961

3,001,134
SEMICONDUCTOR DEVICE
Esther Conwell, Bayside, and Abraham Many, Jamaica, N.Y., assignors, by mesne assignments, to Sylvania Electric Products Inc., Wilmington, Del., a corporation of Delaware
Filed Oct. 10, 1958, Ser. No. 766,452
2 Claims. (Cl. 324—95)

Our invention is directed toward devices for measuring values of electrical power produced at microwave frequencies.

Microwave energy is often supplied to a microwave chamber, such as a cavity or waveguide, during discretely spaced intervals of time; i.e. the energy is supplied discontinuously over a short duty cycle rather than continuously. It is frequently necessary to measure the mean value of the microwave power delivered to the chamber during any such interval, this mean value being referred to hereinafter as the duty cycle mean.

Insofar as we are aware, the technique now known to the art does not permit duty cycle mean values to be measured directly. Instead, the overall average power delivered to the chamber integrated over many cycles is measured by a bolometer or similar instrument and the desired duty cycle means is computed from these measured parameters. When, as is normally the case, the duty cycle is quite short, the average power values are much smaller than the duty cycle mean. Accordingly, the sensitivity and hence the accuracy of the bolometer type measurements are relatively low.

In contradistinction, we have invented a device which directly measures the duty cycle mean power. As a result, the sensitivity and accuracy of measurement are sharply increased. Further, the response of our device is independent from the duration of the duty cycle. For example, when the duty cycle is indefinitely long, i.e. continuous wave operation, the device will still measure the duty cycle mean power which, in this case, is the overall average power.

In accordance with the principles of our invention, microwave energy is supplied to a microwave chamber, such as a waveguide or cavity, and an electromagnetic field is established within the chamber. A semiconductor body of N or P type conductivity and having first and second spaced apart electrodes secured thereto is inserted within the chamber. The resistivity of this body is not constant, but is determined by the magnitude of the electric field induced in the body, the resistivity of this body, as further discussed below, decreasing as this magnitude increases. Means coupled to both electrodes produce an output signal which is uniquely determined by the duty cycle mean power.

When the energy is supplied to the chamber during discretely spaced intervals of time, the output signal assumes the shape of a rectangular pulse whose amplitude defines the duty cycle mean power during each interval.

For continuous wave operation, the output signal is a direct voltage whose amplitude defines the overall average power.

In contradistinction to bolometer type devices, power measurements obtained from the use of our invention are relatively insensitive to variations in ambient temperature, with a corresponding increase in accuracy.

The semiconductor body employed in our invention can be of any homogeneous semiconductor material of either conductivity type providing that (a) over a selected range of intensities of an applied electric field, the mobility of the charge carriers within the body increases with increasing field intensity, or (b) over a selected range of intensities of an applied electric field, the number of charge carriers within the body increases with increasing electric field intensity.

The first requirement (a) can be explained as follows. When the number of charge carriers in a given semiconductor body is constant, the body resistivity is inversely proportional to the carrier mobility. The mobility is determined by the nature and frequency of the collisions which take place between the carriers and the thermal vibration of the lattice (lattice scattering) and between the carriers and ionized donors or acceptors (impurity scattering). The effect of impurity scattering decreases as the average speed of the carriers increases. Thus, when impurity scattering is predominant (i.e. an order of magnitude larger than lattice scattering), the carrier mobility will increase as this average speed increases. The average speed of the carriers can be increased by applying a high electric field to the body. Within a specified range of field intensities and temperatures, the mobility will increase monotonically with increasing field intensities and hence the resistivity will decrease accordingly. Germanium containing either group III or group V impurities within the approximate range .03–.10 ohm centimeters is an example of semiconductor material which, when operated at a temperature of about 50° Kelvin, will satisfy this first requirement.

The second requirement (b) can be explained as follows. When the carrier mobility is constant in a given semiconductor body, the body resistivity varies inversely with the number of carriers. However, in addition to the carriers, the body contains electrons which are bound either to impurity (or other defect) levels or to the atoms of the material (i.e. these electrons are originally in the valence band). Under the influence of high electric fields, some of the bound electrons are released and thus additional charge carriers are produced. Hence, the total number of carriers is increased and the body resistivity is decreased accordingly.

One example of a material satisfying the second requirement is germanium containing group V impurities and an additional copper impurity, the copper concentration being from one half to one third as large as the other impurity concentration, and having a room temperature resistivity falling within the approximate range .1 to 50 ohm centimeters. The operating temperature of this material can be as high as room temperature (300° Kelvin).

A second example of a material satisfying the second requirement is indium antimonide. At room temperature, the range of electric field which produces the desired effect is approximately 150 to 600 volts per centimeter.

An illustrative embodiment of our invention will now be described with reference to the accompanying drawings wherein FIG. 1 is a schematic diagram of one embodiment of our invention;

FIGS. 2a, 2b, 2c and 2d are waveforms of the input and output signals of the device of FIG. 1; and FIG. 3 is a graph illustrating the type of resistivity characteristic obtainable from our device.

Referring now to FIG. 1, there is shown a microwave chamber, in this example, a waveguide section 10. Inserted in this section 10 is an elongated body 12 formed from a material of the type previously discussed and having first and second electrodes 14 and 16 secured to the body at spaced apart locations, for example, at opposite ends of body 12. The electrode 14 is coupled to one end of resistor 18 positioned externally of section 10, the other end of resistor 18 being coupled to one side of battery 20. Battery 20 is also positioned externally of section 10. Electrode 16 is coupled to the other side of battery 20. Terminals 22 and 24 are coupled to opposite ends of resistor 18 and an oscilloscope 30 is coupled to the terminals 22 and 24.

The semiconductor body 12 has a resistivity characteristic of the type shown in FIG. 3. As shown in curve 400, as the electric field intensity increases, the current first increases linearly with increasing field intensity, then increases more rapidly than linearly with increasing field. The resistivity which is the inverse slope of this curve, thus decreases monotonically in the non-linear region. Since the instantaneous power is proportional to the square of the electric field, this power can be measured by measuring the value of the instantaneous resistivity, providing that the specific values of this characteristic have been previously determined; i.e. that the body has been previously calibrated. The body is calibrated by applying voltage pulses of known amplitudes directly across the body and measuring its resistance-power characteristic. The curve 400 represents the characteristics of materials satisfying the requirement (b) previously discussed. Materials satisfying requirement (a) have the same characteristic, somewhat diminished in peak current-field values.

In the circuit of FIG. 1, when the value of resistor 18 is low relative to the lowest resistivity value of body 12, the voltage across body 12 produced by battery 20 is essentially constant. Then, as the resistivity of body 12 changes, the current flow through resistor 18 changes accordingly; the resultant voltage changes across resistor 18 appear between terminals 22 and 24.

If desired, the changes in resistivity can be measured, using a simple bridge circuit with an oscilloscope as a null indicator. The power can then be read directly from a calibrated potentiometer on the bridge circuit.

Microwave energy is supplied to the section 10 during discretely spaced time intervals. The duration of $T_1$, $T_3$ of each interval (the duty cycle), for example, can be of the order of $10^{-6}$ seconds, the time separation $T_2$ between adjacent intervals can be, for example, of the order of $10^{-3}$ seconds and the electric field can vary sinusoidally within each interval $T_1$, $T_3$, for example, at a frequency of 300 megacycles per second, as shown in FIG. 2a.

Since the resistivity of body 12 varies with the magnitude of the electric field and is independent of its polarity, the variations of body resistivity will resemble a rectified signal; however, the waveform will be non-sinusoidal. The waveforms for materials satisfying requirement (a) are shown in curve 100 of FIG. 2b; those for materials satisfying requirement (b) are shown in FIG. 2c. The circuitry of the detecting system does not respond to microwave frequencies. Hence, the signal displayed by the oscilloscope will be a rectangular shaped pulse having an amplitude uniquely specifying the duty cycle mean power during each interval $T_1$, $T_3$, as shown by curve 300 of FIG. 2d.

The semiconductor body can be composed of any semiconductor material of one or the other conductivity type which has a characteristic of the type shown in FIG. 3, as for example, germanium, silicon, indium antimonide and the like.

The choice of the material will depend upon the ranges of power to be measured. Power levels as low as milliwatts and as high as hundreds of kilowatts can be measured in this manner.

The semiconductor body is sufficiently small relative to the size of the chamber to act as a probe and thus will not disturb the electromagnetic field distribution or intensity within the chamber. The sensitivity of the body is independent of the body thickness and consequently is not impaired when the body is used as a probe. The power measurements are extremely accurate on the order of one percent or less.

The device described with reference to FIGS. 1 and 2a, 2b, 2c and 2d measures the duty cycle mean power. However, when section 10 is continuously supplied with power, the interval $T_1$ will be indefinitely long. Hence, the duty cycle becomes indefinitely long, and the duty cycle mean power is effectively the same as the average power.

Since our device acts as a rectifier, when the duty cycle is indefinitely long and the power delivered to the chamber changes gradually, our device can function as a demodulator, the amplitude of the output signal changing gradually in accordance with the gradual changes in average power.

What is claimed is:

1. In combination with a microwave chamber responsive to incident microwave energy supplied thereto during discretely spaced intervals of time whereby a pulsating electromagnetic field is established within said chamber, means to produce an output signal uniquely identifying the duty cycle mean power during any said interval comprising a semiconductor body of one conductivity type inserted within said chamber and having first and second spaced apart electrodes secured thereto, the resistivity of said body varying in accordance with the instantaneous value of the magnitude of the electric field during any said interval, said resistivity decreasing as said value increases.

2. In combination with a microwave chamber responsive to incident microwave energy supplied thereto during discretely spaced intervals of time whereby a pulsating electromagnetic field is established within said chamber, means to produce a rectangular shaped output pulse uniquely identifying the duty cycle mean power during any said interval comprising a semiconductor body of one conductivity type inserted within said chamber and having first and second spaced apart electrodes secured thereto, the resistivity of said body varying in accordance with the instantaneous value of the magnitude of the electric field during any said interval, said resistivity decreasing as said value increases, and an oscilloscope, said pulse being applied to the input of said oscilloscope.

References Cited in the file of this patent

UNITED STATES PATENTS

| 2,576,344 | Howard | Nov. 27, 1951 |
| 2,745,038 | Sziklai | May 8, 1956 |
| 2,760,013 | Peter | Aug. 21, 1956 |

FOREIGN PATENTS

| 439,457 | Great Britain | Dec. 6, 1935 |